US007003883B2

(12) United States Patent
Tapper

(10) Patent No.: US 7,003,883 B2
(45) Date of Patent: Feb. 28, 2006

(54) CABLE-STRIPPING TOOL

(75) Inventor: Johan Tapper, Hedemora (SE)

(73) Assignee: Pressmaster AB, Alvdalen (SE)

( * ) Notice: Subject to any disclaimer, the term of this patent is extended or adjusted under 35 U.S.C. 154(b) by 0 days.

(21) Appl. No.: 10/307,413

(22) Filed: Dec. 2, 2002

(65) Prior Publication Data

US 2003/0110637 A1 Jun. 19, 2003

(30) Foreign Application Priority Data

Dec. 19, 2001 (SE) .................................. 0104299

(51) Int. Cl.
*H02G 1/12* (2006.01)

(52) U.S. Cl. .......................... 30/90.1; 30/109; 30/111; 81/9.4; D8/51; D8/98

(58) Field of Classification Search ................ 30/90.3, 30/91.2, 278, 109, 90.8, 90.1, 283, 113, 111; 81/9.4, 9.41, 9.42, 9.43; D8/98, 51; 29/426.4, 29/426.5, 33.52
See application file for complete search history.

(56) References Cited

U.S. PATENT DOCUMENTS 4,449,298 A * 5/1984 Putz .......................... 30/90.1
4,640,009 A 2/1987 Liversidge .................. 29/828
4,674,183 A * 6/1987 Ducret ...................... 30/90.1
4,766,672 A * 8/1988 Undin et al. ................ 30/90.1
4,805,302 A * 2/1989 Steiner ...................... 30/90.1
4,873,767 A * 10/1989 Lok .......................... 30/278
4,945,788 A * 8/1990 Matthews ..................... 81/9.4
5,398,413 A * 3/1995 Chen ......................... 30/90.1
5,713,132 A 2/1998 Tarpill ....................... 30/91.2
6,128,976 A 10/2000 Tarpill ....................... 81/9.44
6,138,362 A * 10/2000 Yoshimori ................. 30/90.1
D481,607 S * 11/2003 Ahlgren et al. ............... D8/98

FOREIGN PATENT DOCUMENTS

GB 2 215 143 9/1989
GB 2231732 A * 11/1990

* cited by examiner

*Primary Examiner*—Timothy V. Eloy
*Assistant Examiner*—Phong Nguyen
(74) *Attorney, Agent, or Firm*—Jacobson Holman PLLC

(57) ABSTRACT

A cable-stripping tool includes two parts that can be moved linearly in relation to each other, each of the parts including an opening which can accommodate a cable when the openings are in mutual alignment. The first part carries a cutting blade and has a support arrangement with a ring that, when rotated about an axis, adjusts a cutting depth of the blade. A spring element functions to bias the parts in a direction away from each other, while enabling the two tool parts to be brought together against the spring bias by a user squeezing with only one hand so that the cable to be stripped can be inserted into the tool intermediate the two ends to which force is applied.

11 Claims, 3 Drawing Sheets

CABLE-STRIPPING TOOL

BACKGROUND OF THE INVENTION

1. Field of the Invention

The present invention relates to a cable-stripping tool.

2. Description of the Related Art

Known devices/tools for cable stripping are of a kind having first and second parts which are movable linearly towards and away from each other, a cutting blade which is carried by the first part, a support element which is carried by the first part, an abutment which is carried by the second part, and spring means which mutually bias the first and second parts in their relative movement directions. Using a through-passing opening provided for receiving a cable, such cable can be inserted between the abutment and the cutting blade when the first and second parts are mutually displaced in their respective directions against the bias of the spring element, such that the cable is clamped between the abutment on the one hand and the cutting blade on the other hand when the tool is relieved of load. The distance between the cutting blade and the adjacent part of the support element defines the depth to which the cutting blade penetrates the cable, and at least one of the first and second parts is ring-shaped.

Cable-stripping devices of the aforesaid kind are known from GB-A-22 15 143 and U.S. Pat. No. 4,640,009 for instance. Such devices/tools include two parts which are movable linearly in relation to each other and which carry respectively an abutment means and a cutting blade with an associated cable support that restricts the cutting depth of the blade. Biasing means urge the parts towards each other, so that a cable placed between the abutment means and the blade will be clamped against the blade. Tools of this kind function to establish a radial cut around the cable. The tool has a finger opening spaced from a tool guide that receives the cable, so that a user can readily twist the tool, and therewith the blade, around the cable.

One drawback with the known tools is that they are relatively difficult to open against the spring bias, in order to allow insertion of a cable to be stripped. For instance, GB-A 22 15 143 teaches spring means that bias the linearly movable main parts of the tool towards one another. In order to open the tool, the user needs to move the tool parts apart, which is difficult to achieve even though one part of the tool can be gripped and the other part has a projection/dogging element that enables the second part to be pressed away from the first part with the thumb of the hand gripping the tool.

SUMMARY OF THE INVENTION

Accordingly, one object of the invention is to provide a tool of the aforedescribed kind that can be readily and comfortably manoeuvred with one hand when placing the cable into the tool.

A further object is to provide a tool that will enable the cutting depth of the blade to be set in a positive and comfortable fashion and, at the same time, stabilise the position of the cable or cable on the support.

These objects are achieved by means of the invention.

According to one important feature of the invention, the tool arrangement is such that the main parts of the tool are biased in a direction away from each other by the spring element, and can be moved towards each other against the action of the spring bias, by virtue of the user squeezing the tool in the direction of relative movement of said parts with one hand, by actuation of the opposing ends of the tool in the movement direction of said parts. The tool shall have a length which enables it to be gripped comfortably in the user's hand for squeezing said parts together in the illustrated manner. The tool will also preferably include a rotatable support element which includes around its periphery supports which together with a fixed cutting blade define different blade cutting depths. The tool will also limit the possibility of movement of the cable along the support element. This is achieved by virtue of the fact that the support element has the form of a ring whose inner periphery carries the various supports. The ring-shaped support element may carry signs which indicate the cutting depth that has been established in the instant position of rotation of the ring in relation to a read-off mark on the tool-part at which the support element is rotatably mounted.

The inner periphery of the support element may have a polygonal shape around at least a part of its perimeter, wherein the sides of the polygon define supports located at different distances from the rotational axis of the support element, i.e. from the blade edge when the support elements are situated adjacent the cutting blade.

The supports which lie adjacent to a support that is in a co-operative position with the cutting blade restrict the possibility of the cable sliding along the support concerned.

The abutment may have a wedged-shape so as to prevent displacement of the cable circumferentially in relation to the abutment.

The present invention may be further embodied such that the support element includes a ring-shaped support element that defines the through-passing opening, the ring-shaped support element being a ring which is mounted in the first part for rotation about its axis. The support element includes an abutment which is linearly guided generally radially in respect of the ring, the abutment having a cam follower and the ring having a cam which is in engagement with the cam follower and which is spaced from the center of the ring at a distance which varies around the periphery of the ring so as to enable a cutting depth to be set that corresponds to the rotational position of the ring relative to the first part.

The abutment may be carried by the radially and inwardly facing side of the cam, via the cam follower. In addition, a spring element may be adapted to bias the abutment into contact with the cam.

The present invention may further be embodied such that the ring has an outer peripheral surface which lies against a shoulder on the first part in the combined state of the parts. The outer surface of the ring includes a recess which receives the shoulder in a corresponding rotational position of the ring and therewith enables the parts to be brought together through a further distance corresponding to the depth of the recess.

A holder carrying the cutting blade may be inserted from without into a corresponding guide channel to an operating position in the tool. The inner end of the holder includes a latch arm that has a latch hook which grips around a latch strip for holding the holder in the channel. The inner end-portion of the holder has a wedge-like surface which is able to coact with a post on the second tool part when the two parts are combined and the shoulder is in alignment with the recess on the ring.

According to a further embodiment, the wedge-like surface includes two parts of different inclinations, such that the post first co-acts with the steeper surface so as to apply a significant axial displacement force on the holder and therewith move the holder out of the channel so as to release the holder latching mechanism.

The invention will now be described in more detail by way of example and with reference to the accompanying drawings.

DETAILED DESCRIPTION OF THE PREFERRED EMBODIMENTS

Figure 1:
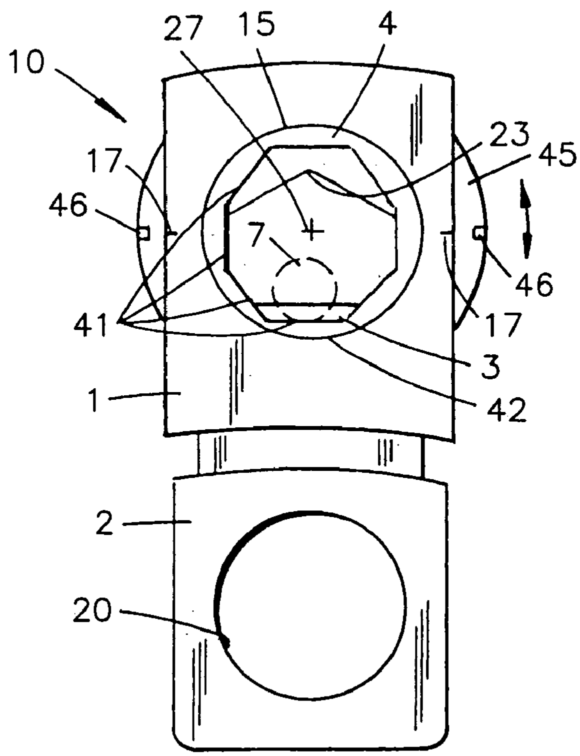
FIG. 1 is a schematic plan view of an inventive tool.
Figure 2:
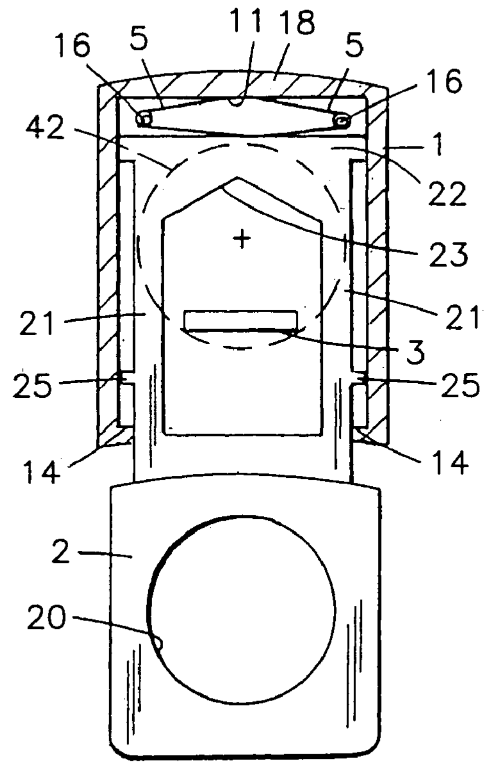
FIG. 2 is a schematic section view of the tool, taken in a plane which is parallel with the plan view of FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The tool 10 includes two main parts 1, 2 which are linearly movable in relation to one another, in a direction that stretches between the short ends of the tool. A ring 4 is rotatably mounted in one main part 1. The outer periphery 15 of the ring 4 is received in a corresponding opening 42 through the part 1. The ring 4 has an outwardly projecting peripheral flange 45 that includes markings 46 spaced peripherally around said flange and capable of being read against a read-off line 17 on the part 1. The flange 45 is exposed outwardly of the part 1, so as to enable the ring 4 to be readily rotated manually, via the flange 45.

The inner wall of the ring 4 has a polygonal configuration which is comprised of a number of supports 41 that lie at different distances from the rotational axis 27 of the ring 4. The part 1 carries a cutting blade 3 whose cutting edge is exposed in the ring cavity at its portion facing towards the part 2.

The part 2 extends into the upper portion of the part 1 through the medium of a pair of posts 21, and is connected to a crosspiece 22. The part 1 has a recess which receives the portions 21, 22 of the part 2. The upper end wall 18 of the part 1 defines an abutment surface 11 for a pair of spring elements 5, which also act on the crosspiece 22. The springs 5 include two spring legs and a winding turn located between said legs and received on an associated guide pin 16 in the part 1. The springs 5 form pressure springs that act between the end wall 18 and the crosspiece 22 for moving the parts 1, 2 away from each other. A latching element 14, 25 prevents the parts 1, 2 from being parted by the springs 5 beyond a chosen limit position. The crosspiece 22 forms an angled abutment 23. The part 2 has a finger opening 20 at its exposed end, the axis of said opening being parallel with the axis of the ring 4.

Figure 3:
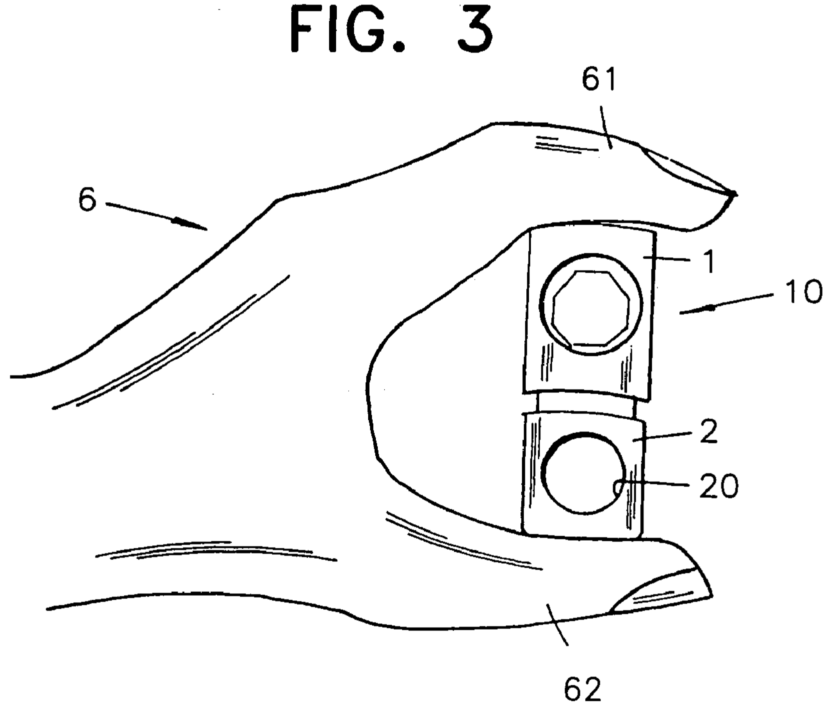
FIG. 3 illustrates the cable stripping opening of the tool exposed for insertion of a cable thereinto.

FIG. 3 shows that the placement of the supports 41 around the inner perimeter of the ring 4 and the rotational mounting of the ring 4 in the part 1 enables a limited length of the tool 10 to be achieved in the relative direction of displacement of the parts 1, 2, so that the tool 10 can be comfortably gripped between the index finger 61 and the thumb 62 of one hand for squeezing of the tool 10 against the action of the springs 5. When so squeezed, the abutment 23 will expose the opening of the ring 4 intermediate the two ends to which force is applied and therewith enable the cable to be inserted therein. When the compression load on the tool is thereafter relieved, the abutment 23 drives the cable 7 against the cutting blade 3, which cuts into the cable 7 to a depth defined by the support 41 located at that instance in the co-operating position relative to the blade edge 3. It will be noted that the cutting depth of the blade 3 can be set easily, by rotating the ring 4 via its exposed ring-flange 45. When the cable 7 is firmly gripped between the abutment and the blade, the operator is able to insert a finger into the opening 20 of the part 2 and turn the tool 10 around the cable 7 through one revolution, whereafter the tool can be displaced axially towards the end of the cable to strip-off the cut cable casing. Alternatively, the tool can be squeezed to enable it to be removed from the cable 7.

FIG. 1 shows the tool 10 in a squeezed state, and shows that the edge of the cutting blade is exposed in the opening of the ring 4, when viewing the tool in the axial direction of the ring. The abutment 23 is shown in the upper part of the ring opening for the sake of clarity. When the load on the tool is removed, i.e., when the first and second parts are no longer pressed toward one another by the user, the abutment 23 moves towards the cutting blade 3. The cutting blade 3 may be replaceable and swapped with blades whose edges have a different angle to the axis of the ring, so as to provide other cutting-depth ranges. The cutting blade 3 is conveniently perpendicular to the direction of relative displacement of the tool parts, so that the cutting depth of the blade will be generally the same in both possible directions of rotation of the tool around the cable 7.

Figure 4:
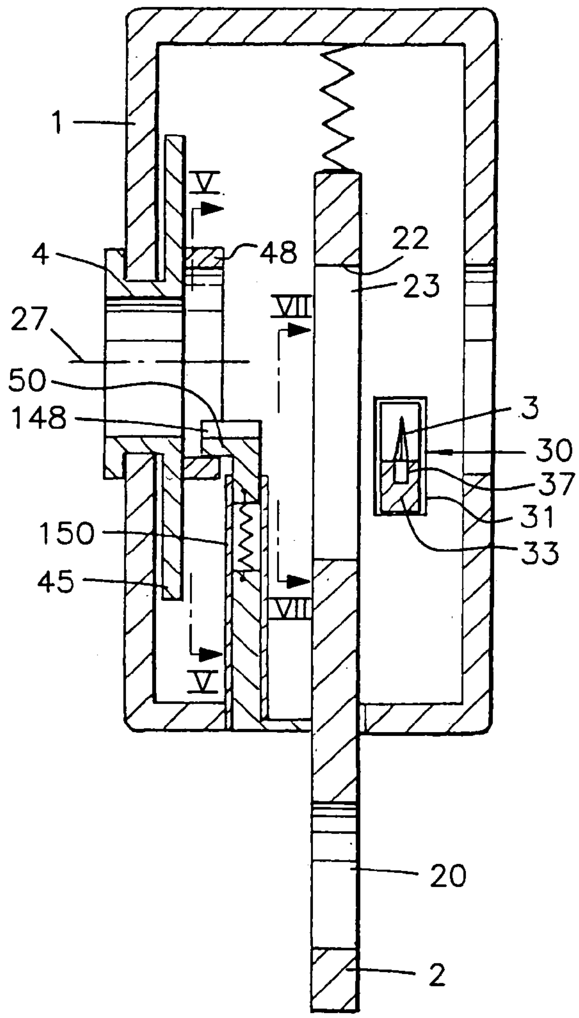
FIG. 4 is a schematic section view of one tool variant, wherein the section can be assumed to lie in a symmetry plane with respect to the tool.
Figure 5:
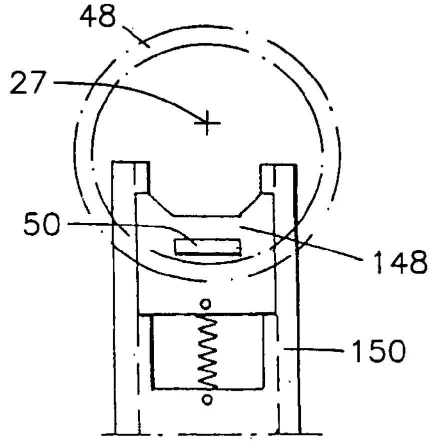
FIG. 5 is a schematic view taken on the line 5—5 in FIG. 4.

Alternatively, the depth of the blade 3 can be controlled or adjusted by the modification shown in FIGS. 4 and 5. The modification includes a support element 148 which is guided linearly by a guide 150 in a direction towards the centre region of the ring 4. The support element 148 may have a generally cupped-shape, i.e. include a bottom and side-walls for stable reception of a cable whilst the tool 10 is pressed around said cable. The support element 148 includes a cam follower 50 which engages a cam 48 on the ring 4. The distance of the cam 48 from the centre of the ring varies around the ring perimeter, and the cam can thus displace the support element 148 to different distances from the cutting blade 3. The support element 148 is shown to be biased by a spring in a radially outward direction, while the support element 148 rests on the cam follower 50 at the same time.

Figure 6:
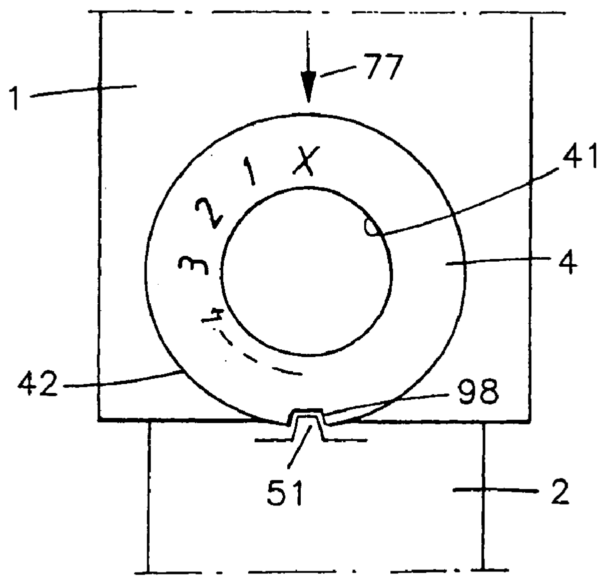
FIG. 6 is a partial front view of one tool variant.

FIG. 6 shows the ring 4 fitted in the part 1, and also shows that the outer perimeter 42 of the ring supports against a shoulder 51 on the part 2 when the parts 1, 2 are combined, with the exception of one position of rotation of the ring 4 in which a recess 98 in the periphery 42 of the ring 4 receives the shoulder 51. This position of rotation may correspond to an end position for rotation of the ring 4, which is indicated in FIG. 6 by a marking X on the ring 4 lying in alignment with an indicator 77 on the part 1.

In this particular rotational position of the ring 4, the parts 1, 2 can be brought further together through a distance corresponding to the depth of the recess 98.

As will be seen from FIG. 4, the part 1 includes a through-passing channel 31 for accommodating a blade holder 30 which grips the cutting blade 3. The blade holder may have the form of a plastic body which receives the blade 3 and which forms a finger-grip 32 at one end of the channel 31. The finger-grip end 32 is shown to be flush with the outside of the part 1 when the blade holder unit 30 is fully inserted into the channel 31. Provided on the insertion end of the unit 30 is a further plastic body 34 which may be an integral part of a plastic-portion 33 that receives the bottom portion of the blade 3 and connects the parts 32, 34 as well as the side parts 37. The part 34 is extended by a flexible arm 35 which carries a latch hook 36 which is shown to grip over a latch strip 38. The underpart of the body 34 is shown to consist of a wedge-shaped surface that co-acts with a post 80 connected to the part 2.

Figure 7:
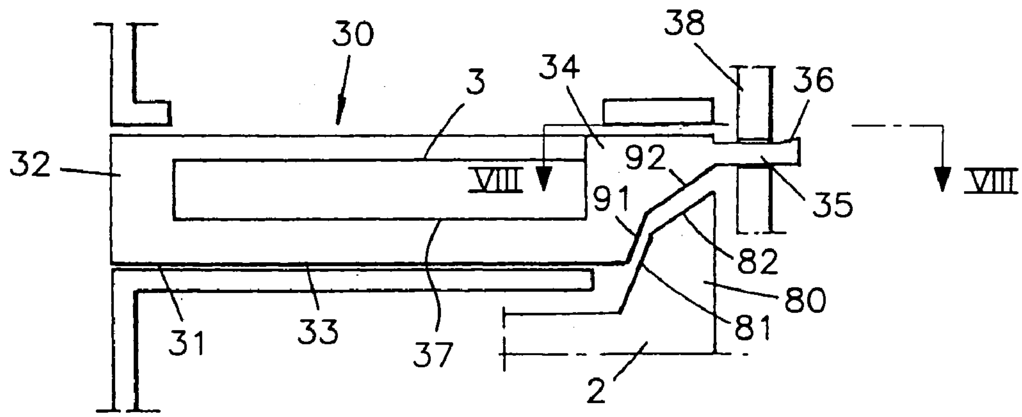
FIG. 7 is a schematic view taken on the line VII—VII in FIG. 4.
Figure 8:
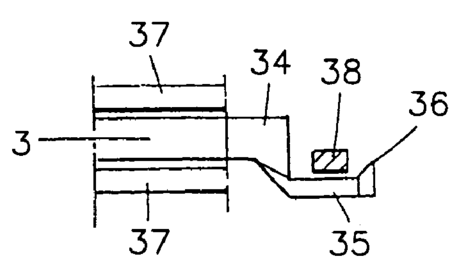
FIG. 8 is a sectional view taken on the line VIII—VIII in FIG. 7.

The wedge-shaped surface of the body 34 is shown to comprise two adjacent oblique surfaces 91, 92 of different inclinations, and the post 80 is shown to have two corresponding oblique surfaces 81, 82. The steep surfaces 81, 91 first engage one another when the shoulder 51 engages the recess 98 (FIG. 6) and then promote axial displacement of the unit 30 to the left in FIG. 7, wherein the latch hook 36, which may optionally have an oblique latching surface, and the arm 35 are able to pass free from the latch strip 38. When the less steep wedge-like surfaces 82, 92 engage one another, the unit 30 is driven out of the channel 31 and therewith allow the unit to be gripped at its grip end 32 for withdrawal and replacement. When a new unit 30 is placed in the channel 31, the arm 35 and the latch hook 36, which has a wedge-shaped surface, can be bent out to engage behind the latch strip 38. The latch hook 36 and the arm 35 are arranged, together with the latch strip 38, to hold the blade holder unit 30 firmly in the channel 31.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A cable-stripping tool comprising:

a first part carrying a cutting blade in an interior thereof and having a first part outer end constituting a last part lengthwise of said first part;

a second part having a second part outer end constituting a last part lengthwise of said second part and a second part inner end, an abutment being formed adjacent said inner end, said first part and said second part being movable linearly towards and away from each other, with said second part inner end fitting within the interior of said first part, said first part outer end and said second part outer end defining therebetween an overall length of said tool;

a through-passing opening in said first and second parts for receiving a cable, said opening being defined in said first part by a support arrangement that is rotatable about an axis;

a spring element mutually biasing said first and second parts away from each other, a force applied to said first part outer end and said second part outer end against the bias of said spring element mutually displacing said first and second parts toward one another such that a cable can be inserted into the through-passing opening and between the abutment and the cutting blade, said cable being clamped between the abutment and the cutting blade when the force displacing said parts is removed, a distance between the cutting blade and an adjacent part of the support arrangement defining a depth to which the cutting blade penetrates the cable, said cutting depth being adjustable through rotation of said support arrangement about said axis; and said overall length of said tool in the direction of movement of said parts being adapted to enable a user squeezing with only one hand to apply the force against the two outer ends of the tool in the direction of movement of said parts so as to expose the cable receiving opening which is located between said two outer ends.

2. The tool according to claim 1, wherein said support arrangement includes a ring having a plurality of supports along an inner wall thereof which are spaced around a perimeter of said inner wall at different distances from said rotational axis of the support arrangement.

3. The tool according claim 1, wherein each peripheral part of said opening defined in said first part has a distance from said rotational axis that varies around a periphery thereof.

4. The tool according to claim 1, wherein said support arrangement includes a ring mounted in said first part for rotation about said axis, and a support element that is linearly guided generally radially in respect of said ring, said support element having a cam follower and said ring having a cam in engagement with said cam follower, said cam being spaced from a center of the ring at a distance which varies around a periphery thereof so as to enable the cutting depth to be set through rotation of said ring.

5. The tool according to claim 4, wherein the support element is carried by a radially and inwardly facing side of the cam, via the cam follower.

6. The tool according to claim 5, wherein a second spring element is adapted to bias the support element into contact with the cam.

7. A cable-stripping tool comprising:

a first part carrying a cutting blade in an interior thereof and having a first part outer end constituting a last part lengthwise of said first part;

a second part having a second part outer end constituting a last part lengthwise of said second part and a second part inner end, an abutment and a first through-passing opening being formed adjacent said inner end, said first part and said second part being movable linearly towards and away from each other, with said second part inner end fitting within the interior of said first part, said first part outer end and said second part outer end defining therebetween an overall length of said tool;

a ring rotatably mounted in said first part and defining a second through-passing opening therein for receiving a cable, said ring defining a surface around a periphery thereof so as to enable a variable cutting depth into said cable to be set by rotating the ring relative to said first part;

a spring element mutually biasing said first and second parts away from each other, a force applied to said first part outer end and said second part outer end against the bias of said spring element mutually displacing said parts toward one another to align said first and second through-passing openings such that a cable can be inserted therethrough, said cable being clamped between the abutment and the cutting blade when the force displacing said parts is removed; and rotation of said first and second parts around said cable cutting said cable at said set cutting depth.

8. The tool according to claim 7, wherein said overall length of said tool in the direction of movement of said parts is adapted to enable a user squeezing with only one hand to apply the force against the two outer ends of the tool in the direction of movement of said parts so as to align the cable receiving openings.

9. The tool according to claim 7, wherein said ring has a cam spaced from a center of said ring at a distance which varies around a periphery thereof so as to enable the cutting depth to be set by rotating the ring relative to said first part, a support element being mounted in said first part and linearly guided generally radially with respect to said ring, said support element having a cam follower in engagement with said cam.

10. The tool according to claim 9, wherein the support element is carried by a radially and inwardly facing side of the cam, via the cam follower.

11. The tool according to claim 10, wherein a second spring element is adapted to bias the support element into contact with the cam.

* * * * *